US010970533B2

(12) United States Patent
Phipps et al.

(10) Patent No.: US 10,970,533 B2
(45) Date of Patent: Apr. 6, 2021

(54) METHODS AND SYSTEMS FOR FINDING ELEMENTS IN OPTICAL CHARACTER RECOGNITION DOCUMENTS

(71) Applicant: INTERNATIONAL BUSINESS MACHINES CORPORATION, Armonk, NY (US)

(72) Inventors: Christopher Phipps, Sacramento, CA (US); Edward Katz, Herndon, VA (US); Charles Beller, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 16/460,625

(22) Filed: Jul. 2, 2019

(65) Prior Publication Data

US 2021/0004579 A1 Jan. 7, 2021

(51) Int. Cl.
*G06K 9/00* (2006.01)
*G06K 9/62* (2006.01)
(52) U.S. Cl.
CPC ..... *G06K 9/00456* (2013.01); *G06K 9/00463* (2013.01); *G06K 9/00469* (2013.01); *G06K 9/6254* (2013.01); *G06K 2209/01* (2013.01)
(58) Field of Classification Search
CPC ........... G06K 9/00456; G06K 9/00469; G06K 9/00463; G06K 9/6254; G06K 2209/01
See application file for complete search history.

(56) References Cited

U.S. PATENT DOCUMENTS

| 7,650,035 | B2 | 1/2010 | Vincent et al. |
| 10,445,571 | B1* | 10/2019 | Gaeta ...................... G06F 16/93 |
| 2014/0369602 | A1 | 12/2014 | Hyland |
| 2017/0330030 | A1* | 11/2017 | Kalyuzhny ........ G06K 9/00483 |
| 2018/0046889 | A1* | 2/2018 | Kapinos ................ H04L 9/3239 |
| 2020/0074169 | A1* | 3/2020 | Mukhopadhyay .......................... G06K 9/00449 |

FOREIGN PATENT DOCUMENTS

| CN | 109446900 A | 3/2019 |
| WO | 2016014397 A1 | 1/2016 |

* cited by examiner

*Primary Examiner* — Tom Y Lu
(74) *Attorney, Agent, or Firm* — Griffiths & Seaton PLLC

(57) ABSTRACT

Embodiments for finding elements in optical character recognition (OCR) documents are provided. An indication of a selected portion of document is received. Salient pixels in the selected portion of the document are determined. Properties of the salient pixels in the selected portion of the document are identified. The properties of the salient pixels in the selected portion of the document are compared to properties of pixels in each of a plurality of portions of an OCR-converted version of the document. A cognitive analysis is utilized to select at least some of the plurality of portions of the OCR-converted version of the document as suspected matches to the selected portion of the document.

21 Claims, 11 Drawing Sheets

Fake Document for OCR

Section 1

Lorem ipsum dolor sit amet, consectetur adipiscing elit. Quisque accumsan fringilla neque ut lobortis. Duis elementum, neque eget varius egestas, orci odio cursus tellus, in placerat odio urna maximus ex. Aliquam erat volutpat. Donec vel ullamcorper tellus. Curabitur eget arcu sagittis facilisis. Mauris vel massa et diam efficitur mattis vitae vitae justo. Nunc eu orci ac arcu volutpat eleifend vel sit amet lectus. In sed tempor nisl. Duis vitae sagittis libero. Fusce in sollicitudin magna.

Section 2

Etiam rhoncus consectetur leo. Nullam fermentum lectus vitae finibus laoreet. Pellentesque varius quam ac dapibus met sem eu odio faucibus cursus vel dolor. Integer malesuada urna in metus dapibus, ac sagittis ante. Nunc rutrum ipsum id leo tempor scelerisque. Cras pellentesque.

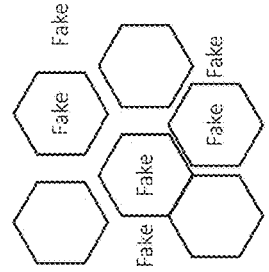

It is hereby stated that the property will be purachesed by Christopher Phipps (hereafter "Borrower") and secured by Graham Katz (hereafter "Guarantor") from Charley Beller (hereafter "Seller").

Morbi mi justo, vehicula nec vulputate ac, cursus id dui. Phasellus iaculis ultricies consequat. Sed ultricies sollicitudin mauris maximus euismod. Proin ac leo ras hendrerit id velit ac lacinia. Sed sit amet felis nec.

Quis mattis porttitor massa, in bibendum neque facilisis a. Phasellus ac dapibus nibh. Sed viverra in orci ac tempor. Nam sit amet magna pretium, ornare estivel, euismod nulla. Fusce eget lacus aliquam, rhoncus elit.

FIG. 4

Fake Document for OCR
Section 1
Lorem ipsum dolor sit amet, consectetur adipiscing elit. Quisque accumsan fringilla neque ut lobortis. Duis elementum, neque eget varius egestas, orci odio cursus tellus, in placerat odio urna maximus ex. Aliquam erat volutpat. Donec vel ullamcorper tellus. Curabitur eget arcu sagittis facilisis. Mauris vel massa et diam efficitur mattis vitae vitae justo. Nunc eu orci ac arcu volutpat eleifend vel sit amet lectus. In sed tempor nisl. Duis vitae sagittis libero. Fusce in sollicitudin magna.
Section 2
Etiam rhoncus consectetur leo. Nullam fermentum lectus vitae finibus laoreet. Pellentesque varius quam ac dapibus met sem eu odio faucibus cursus vel dolor. Integer malesuada urna in metus dapibus, ac sagittis ante. Nunc rutrum ipsum id leo tempor scelerisque. Cras pellentesque.
It is hereby stated that the property will be purachesed by Christopher Phipps (hereafter Fake "Borrower"), and secured by Graham Katz (hereafter "Guarantor") from Charley Beller (hereafter "Seller").

Fake morbi mi justo, vehicula nec vulputate ac, cursus id dui. Phasellus iaculis ultricies consequat. Sed ultricies sollicitudin mauris maximus Fake euismod. Proin ac leo ras hendrerit id velit ac lacinia. Sed sit amet felis nec.

Quis mattis porttitor massa, in bibendum neque facilisis a. Phasellus ac dapibus nibh. Sed viverra in orci ac tempor. Nam sit amet magna pretium, ornare est vel, euismod nulla. Fusce eget lacus aliquam, rhoncus elit.

Fake Document for OCR.
Section 1
Lorem ipsum dolor sit amet, consectetur adipiscing elit. Quisque accumsan fringilla neque ut lobortis. Duis elementum, neque eget varius egestas, orci odio cursus tellus, in placerat odio urna maximus ex. Aliquam erat volutpat. Donec vel ullamcorper tellus. Curabitur eget arcu sagittis facilisis. Mauris vel massa et diam efficitur mattis vitae vitae justo. Nunc eu orci ac arcu volutpat eleifend vel sit amet lectus. In sed tempor nisl. Duis vitae sagittis libero. Fusce in sollicitudin magna.
Section 2
Etiam rhoncus consectetur leo. Nullam fermentum lectus vitae finibus laoreet. Pellentesque varius quam ac dapibus met sem eu odio faucibus cursus vel dolor. Integer malesuada urna in metus dapibus, ac sagittis ante. Nunc rutrum ipsum id leo tempor scelerisque. Cras pellentesque.

purachesed by Christopher Phipps (hereafter Fake "Borrower"), and secured by Graham Katz (hereafter "Guarantor") from Charley Beller (hereafter "Seller").

Fake morbi mi justo, vehicula nec vulputate ac, cursus id dui. Phasellus iaculis ultricies consequat. Sed ultricies sollicitudin mauris maximus sit amet felis nec.

Fake euismod. Proin ac leo ras hendrerit id velit ac lacinia. Sed sit amet felis nec.

Quis mattis porttitor massa, in bibendum neque facilisis a. Phasellus ac dapibus nibh. Sed viverra in orci ac tempor. Nam sit amet magna pretium ornare est vel, euismod nulla. Fusce eget lacus aliquam, rhoncus elit.

METHODS AND SYSTEMS FOR FINDING ELEMENTS IN OPTICAL CHARACTER RECOGNITION DOCUMENTS

BACKGROUND OF THE INVENTION

Field of the Invention

The present invention relates in general to computing systems, and more particularly, to various embodiments for finding or identifying elements in optical character recognition (OCR) documents.

Description of the Related Art

Optical character recognition (OCR) is the conversion of images of typed, handwritten, or printed text, such as found on scanned documents, photographs of documents, photographs of scenes that include signs, etc., into machine-encoded text. OCR is often used in information entry from paper data records, such as passport documents, invoices, bank statements, computerized receipts, business cards, mail, printouts of static-data, or any suitable documentation and allows such documents to be electronically edited, searched, stored, and otherwise utilized.

Despite advances in OCR techniques in recent years, in some instances, the OCR version or conversion of the document does not perfectly match the original/source document. For example, the location of particular elements (e.g., alphanumeric characters, words, phrases, etc.) in the OCR conversion may not be intuitive given the location of those elements in the original document and/or the OCR processing may not effectively "translate" or capture the elements. This may particularly be an issue when attempting to perform OCR processing on poor quality (e.g., low resolution) documents and/or documents that include elements other than regular text (e.g., annotations/captions on images). As a result, manual/human intervention is often required when searching for particular elements in the OCR documents (e.g., for purposes of error analysis). This process can be very time consuming, labor intensive, and expensive.

SUMMARY OF THE INVENTION

Various embodiments for finding elements in optical character recognition (OCR) documents, by a processor, are provided. An indication of a selected portion of document is received. Salient pixels in the selected portion of the document are determined. Properties of the salient pixels in the selected portion of the document are identified. The properties of the salient pixels in the selected portion of the document are compared to properties of pixels in each of a plurality of portions of an OCR-converted version of the document. A cognitive analysis is utilized to select at least some of the plurality of portions of the OCR-converted version of the document as suspected matches to the selected portion of the document.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a plan view of an exemplary document according to an embodiment of the present invention;

FIG. 5 is a plan view of an exemplary OCR-converted version of the document of FIG. 4 according to an embodiment of the present invention;

FIG. 6 is a plan view of the document of FIG. 4 shown with a grid and a selected portion thereof indicated;

FIG. 7 is a plan view of the OCR-converted version of the document of FIG. 5 with a grid and a suspected match indicated;

FIG. 11 is a plan view of an exemplary user interface displaying results according to an embodiment of the present invention.

DETAILED DESCRIPTION OF THE DRAWINGS

Figure 1:
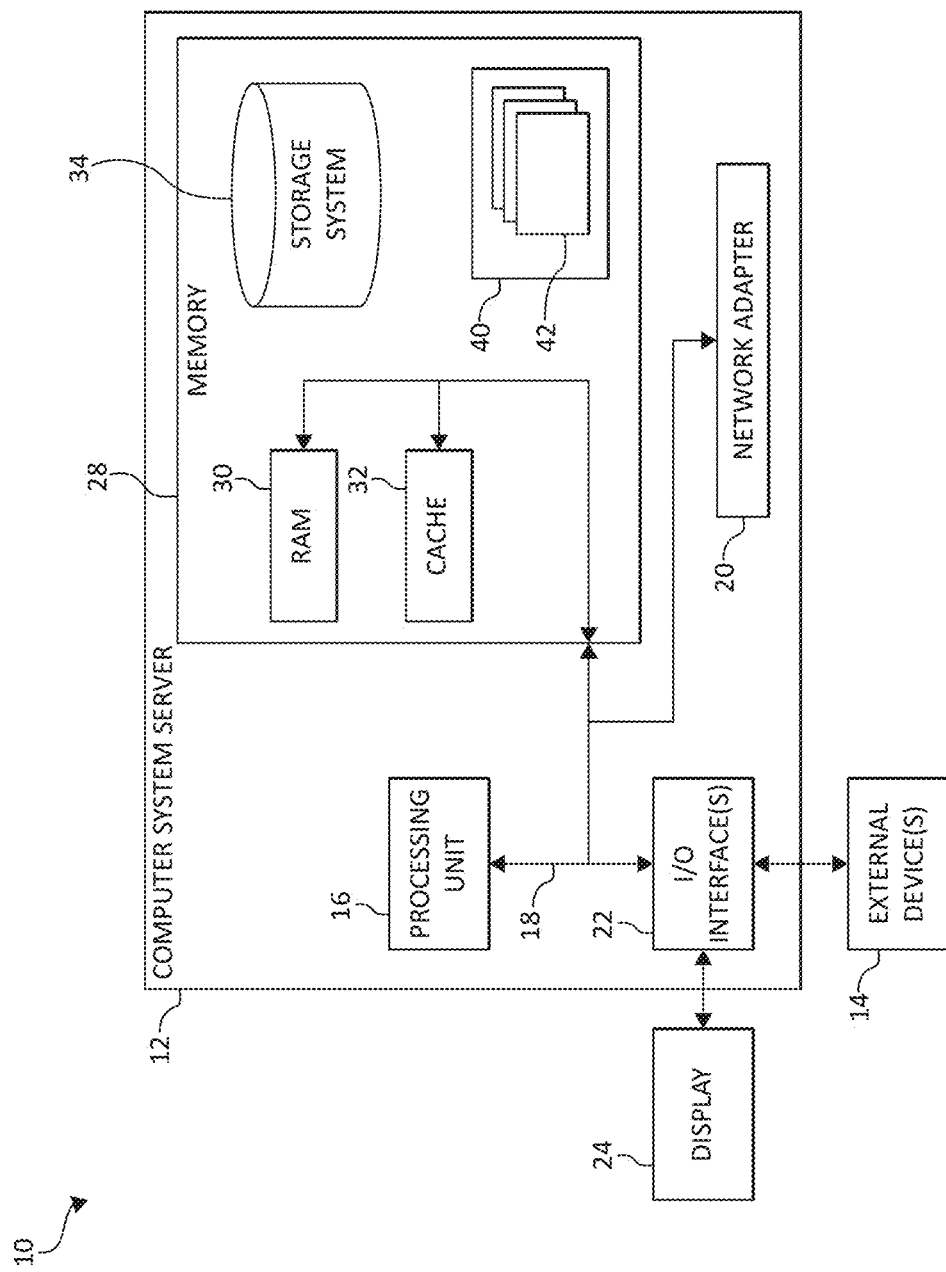
FIG. 1 is a block diagram depicting an exemplary computing node according to an embodiment of the present invention.

As discussed above, optical character recognition (OCR) is the conversion of images of typed, handwritten, or printed text, such as found on scanned documents, photographs of documents, photographs of scenes that include signs, etc., into machine-encoded text. OCR is often used in information entry from paper data records, such as passport documents, invoices, bank statements, computerized receipts, business cards, mail, printouts of static-data, or any suitable documentation and allows such documents to be electronically edited, searched, stored, and otherwise utilized.

Despite advances in OCR techniques in recent years, in some instances, the OCR version or conversion of the document does not perfectly match the original/source document. For example, the location of particular elements (e.g., alphanumeric characters, words, phrases, etc.) in the OCR conversion may not be intuitive given the location of those elements in the original document and/or the OCR processing may not effectively "translate" the elements. This may particularly be an issue when attempting to perform OCR processing on poor quality (e.g., low resolution) documents. As a result, manual/human intervention is often required when searching for particular elements in the OCR documents (e.g., for purposes of error analysis, to obtain particular types of information from the document(s), etc.). This process can be very time consuming, labor intensive, and expensive.

For example, consider a scenario in which an individual (e.g., a banker) is trying to identify or locate particular elements (e.g., alphanumeric characters, words, phrases, etc.) in a loan document (or set of loan documents), such as the name(s) of the borrower(s), as opposed to names of guarantors, loan officers, etc., and/or initial interest rates, as opposed to revised interest rates, rates associated with other loans, tax rates, etc. Although there may be specific areas of the original document(s) which include the desired information, if the document(s) have been converted using an OCR technique, there may be no way of knowing exactly where the information will be located and/or exactly how those areas (and/or the desired information) will appear within the OCR-converted version (or OCR document). Again, this may particularly be an issue when performing OCR processing on poor quality (e.g., low resolution) documents.

Thus, human intervention may be required to manually search through the OCR document to find the desired data and check its appearance. Additionally, when dealing with multiple documents, it may be difficult to ascertain which of them have particularly degraded OCR. As such, all of the OCR documents may have to be manually examined (e.g., to check for errors).

To address these needs and/or the shortcomings in the prior art, in some embodiments described herein, methods and/or systems are disclosed that utilize, for example, salience detection to automatically identify (and/or locate) possible (or suspected) locations of (or matches to) elements of interest (or targeted elements) in an OCR document (or an OCR-converted version of a document). Some embodiments described herein may (also) be utilized in error analysis of OCR processes or techniques.

In some embodiments, if necessary, an original document (e.g., a PDF file) is converted to an image (or image file or document). The image may be of any suitable format, such as RGB, CMYK, or others (which may require some customization). The image (or original document) is processed by a saliency detector, and the output thereof is fed into, for example, a classification network. It should be noted that many documents may not have the color differentiation of photographs. However, saliency may be distinguished utilizing geometric shapes, distances, etc., as described below.

In some embodiments, an indication of one or more selected elements in (or on) the original document is received. For example, the user may be provided with manner in which to indicate one or more portions of the original document(s) (e.g., a PDF file or an image generated from such a file) that includes a word or phrase (or symbol) that they would like to find, locate, and/or identify in the OCR version of the document. For example, the user may use a mouse, or any other suitable user input device, to draw a box around the desired word or phrase.

In some embodiments, sub-regions (e.g., pixels) within the selected portion(s) are then identified as being (or determined to be) salient (e.g., a trigger pattern and a value). In some embodiments, the determination of the salient pixels is based on additional user input (or an indication thereof provided by the user). For example, the user may utilize a mouse to "click" on the salient (or distinctive) points (or pixels) within the selected portion of the document. In some embodiments, a machine learning method (or model) trained in salience detection may (also) be utilized to determine the salient pixels.

A representation of the pixels within the selected portion of the document may then be created to generate an image of the selected portion of the document. In some embodiments, after the OCR processing on the original document is performed, the OCR document is divided or sectioned into a number of portions (e.g., N portions) that are the same size as the selected portion of the original document.

A cognitive analysis or machine learning technique (or an appropriately trained model) may then be utilized to find those of the portions of the OCR document that are "visually similar" to the selected portion of the original document (and/or the created representation thereof). In some embodiments, an appropriate similarity metric is utilized such that only particular ones of the portions of the OCR document are selected. That is, only those portions that are determined to include the attribute trigger and value (i.e., within a predetermined degree) are selected as being similar to the selected portion of the original document.

In some embodiments, an indication of the selected portions of the OCR document (e.g., those that "look like" the selected portion of the original document) is created and provided to the user. For example, the user may be provided with an opportunity to review at least some of the selected portions of the OCR document to check on whether or not they include the desired word, phrase, etc. (or target element (s)) via an electronic communication, pop-up window, user interface, etc. The user may then provide input (or feedback) with respect to the selected portions which may be utilized by the system to generate a list of the instances of the desired word, phrase, etc. in the OCR document(s) (and/or the appropriate portions thereof) and/or refine the returned results.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, finding targeted elements in OCR documents, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

The processes described herein may utilize various information or data sources associated with users (e.g., users who provide search queries) and/or the content (e.g., the document(s), image(s)). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify the user's intended/targeted elements.

It should be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for finding elements in optical character recognition (OCR) documents, by a processor, is provided. An indication of a selected portion of document is received. Salient pixels in the selected portion of the document are determined. Properties of the salient pixels in the selected portion of the document are identified. The properties of the salient pixels in the selected portion of the document are compared to properties of pixels in each of a plurality of portions of an OCR-converted version of the document. A cognitive analysis is utilized to select at least some of the plurality of portions of the OCR-converted version of the document as suspected matches to the selected portion of the document.

The selection of the at least some of the plurality of portions of the OCR-converted version of the document as suspected matches to the selected portion of the document may be performed utilizing a similarity metric. An indication of the suspected matches to the selected portion of the document may be generated.

The identifying of the properties of the salient pixels in the selected portion of the document may include determining a relationship between the salient pixels in the selected portion of the document to other pixels in the document. The determining of the relationship between the salient pixels in the selected portion of the document to the other pixels in the document may be performed utilizing a geometric distance metric.

The determining of the salient pixels in the selected portion of the document may include receiving an indication of the salient pixels from a user and/or be performed utilizing a machine learning method. Each of the plurality of portions of the OCR-converted version of the document may be the same size as the selected portion of the document.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
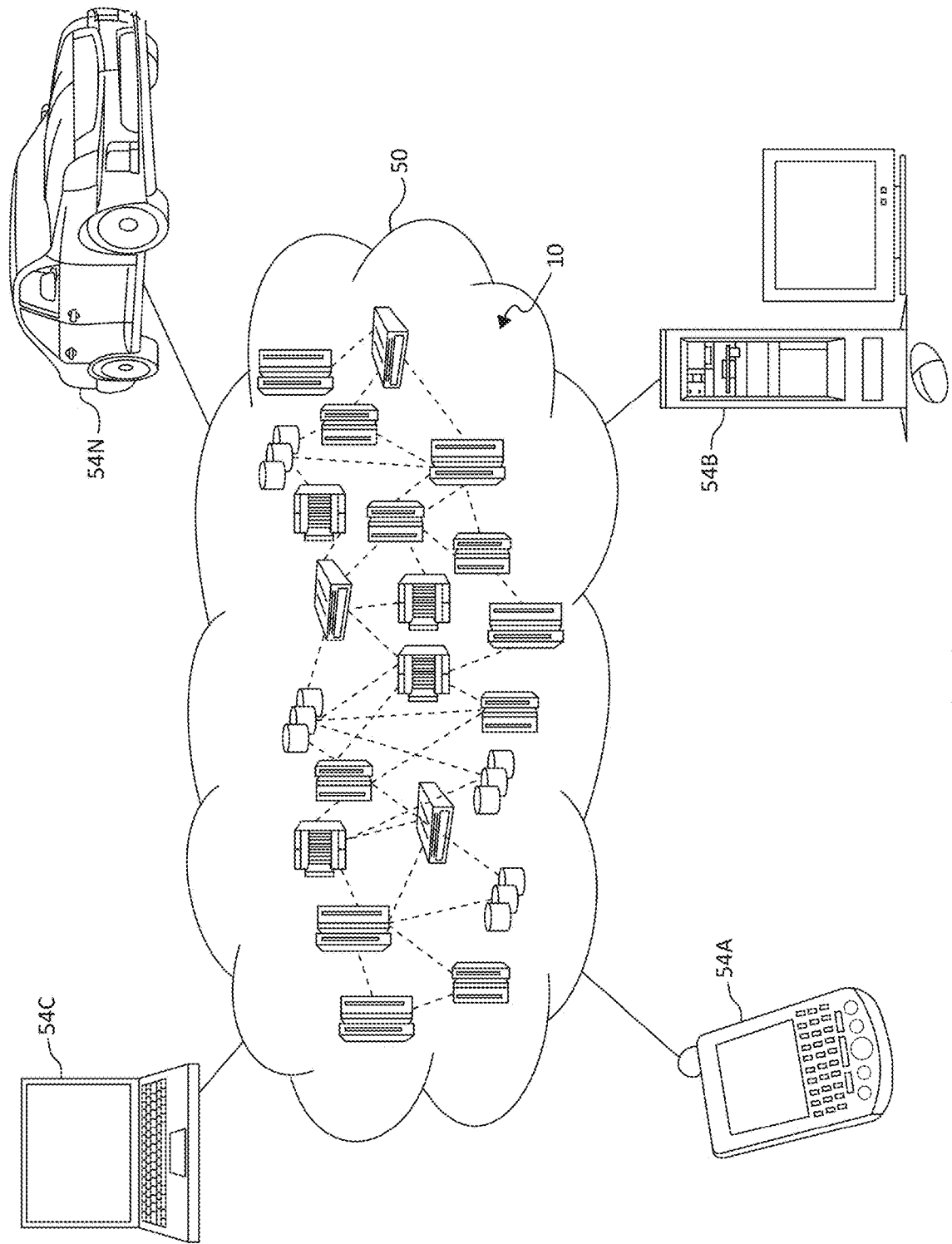
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
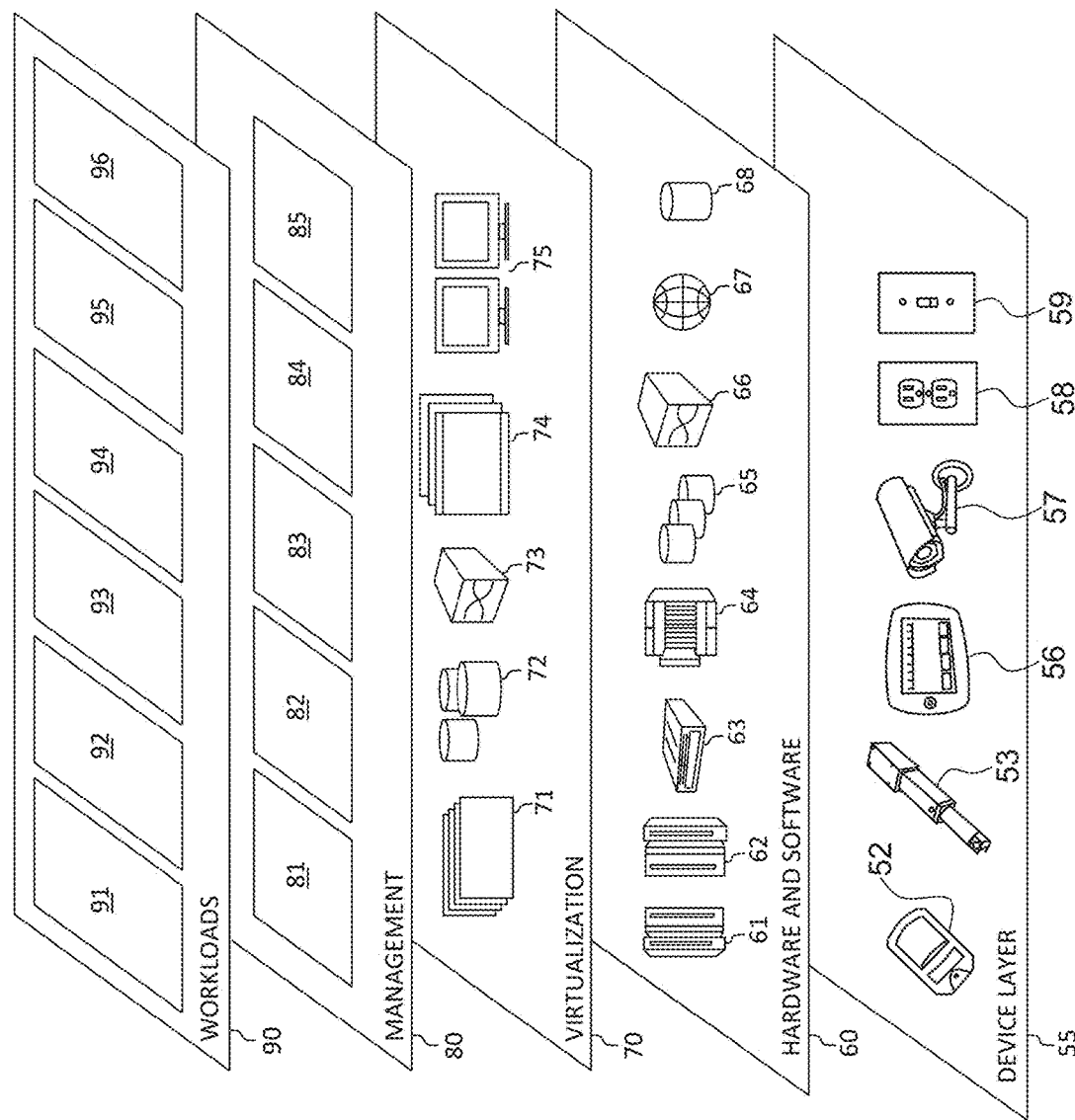
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for finding elements in OCR documents, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for finding elements (or targeted elements) in OCR documents are provided. In some embodiments, a form of salience detection is utilized to automatically identify (and/or locate) possible (or suspected) locations of (or matches to) elements of interest (or target elements) in an OCR document (or OCR-converted version of a document). If necessary, an original document (e.g., a PDF file) may first be converted to an image (or image file or document). An indication of one or more selected elements in (or on) the original document may be received (e.g., from a user). Sub-regions (e.g., pixels) within the area are then identified as being (or determined to be) salient (e.g., a trigger pattern and a value). The determination of the salient pixels may be based on additional user input (or an indication thereof provided by the user) and/or a machine learning method trained in salience detection may be implemented. A representation of the pixels within the selected portion of the document may then be created to generate an image of the selected portion of the document. In some embodiments, after the OCR processing on the original document is performed, the OCR document is divided or sectioned into a number of portions (e.g., N portions) that are the same size as the selected portion of the original document.

A cognitive analysis or machine learning technique (or an appropriately trained model) may then be utilized to find those of the portions of the OCR document that are "similar" to the selected portion of the original document (and/or the created representation thereof). An indication of the selected portions of the OCR document (e.g., those that "look like" the selected portion of the original document) may then created and provided to the user.

FIG. 4 illustrates an exemplary document 400 according to an embodiment of the present invention. The document 400 shown may be understood to be a "first" or "original" document (e.g., a PDF file) that is to be processed via OCR or an image of such a document that has been created in preparation for OCR processing. As shown in FIG. 4, the document 400 has text written thereon, along with some images. However, due to the relatively low quality, poor resolution, etc. of the document 400, the text may be considered relatively difficult to "see," "read," etc. (i.e., the text is not very clear).

FIG. 5 illustrates an exemplary OCR document 500 that is associated with the document 400 shown in FIG. 4. In particular, the OCR document 500 may be considered to be an OCR-converted version of the document 400 of FIG. 4. That is, the OCR document 500 may be the result(s) of document 400 undergoing an OCR process, as is commonly understood. As such, the various words, alphanumeric characters, etc. in the OCR document 500 may be associated with (or "translations" of) respective words, alphanumeric characters, etc. of document 400.

However, the OCR document 500 may be considered to be an "imperfect" translation of document 400 due to, for example, the poor quality of document 400 (and/or the presence of images in document 400). For example, referring now to FIG. 6, the original document 400 is again shown with a grid (or frame) 600 having been generated thereon (or displayed over). The grid 600 includes four sections (or quadrants) 602-608. Still referring to FIG. 6, the position of the term (or name) "Christopher Phipps" on the document 400 has been indicated. In the example shown, "Christopher Phipps" is indicated with a shape (e.g., a rectangle or box) 610 surrounding it. It should be noted that in FIG. 6, "Christopher Phipps" (and/or box 610) is entirely positioned within quadrant 608 of the grid 600. It should also be noted that a term (e.g., "fake") appears in the document next to/associated with the images in the document, as indicated by reference numeral 612.

Referring now to FIG. 7, the OCR document 500 is shown with a grid (or frame) 700 generated thereon, which includes sections (or quadrants) 702-708. It should be noted that the grid 700 (along with quadrants 702-708) may be of the same size as the grid 600 (and quadrants 602-608) shown in FIG. 6 (e.g., at least relative to the respective documents). As shown in FIG. 7, the position of the term "Christopher Phipps" is indicated with a shape (e.g., a box) 710. In this example, "Christopher Phipps" is the OCR process "translation" of "Christopher Phipps" (or a "suspected match" thereof, as described in greater detail below). That is, in the example shown, the OCR process was able to correctly capture the respective text in the original document 400. However, such may not always occur. For example, the OCR process may capture/translate "Christopher Phipps" as "Christopher Plippa." However, still referring to FIG. 7, it should be noted that "Christopher Phipps" (and/or the box 710) is positioned within quadrant 706. That is, the OCR processing has caused the position of "Christopher Phipps" in the OCR document 500 to be different that that of "Christopher Phipps" in the original document 400 (e.g., because of mistakes in capturing elements, the formatting of the OCR document, etc.). As such, in such an example, a user may have difficulty finding the appropriate term in the OCR document 500. Additionally, it should be noted that the term "fake" has been captured/pulled from the image in document 400 and inserted into the text of the OCR document 500. An example of such is indicated by reference numeral 712 in FIG. 7. Such may cause a string pattern used to search for/identify terms in the OCR document 500 to be broken and may cause additional confusion/difficulty for the user.

Figure 6:
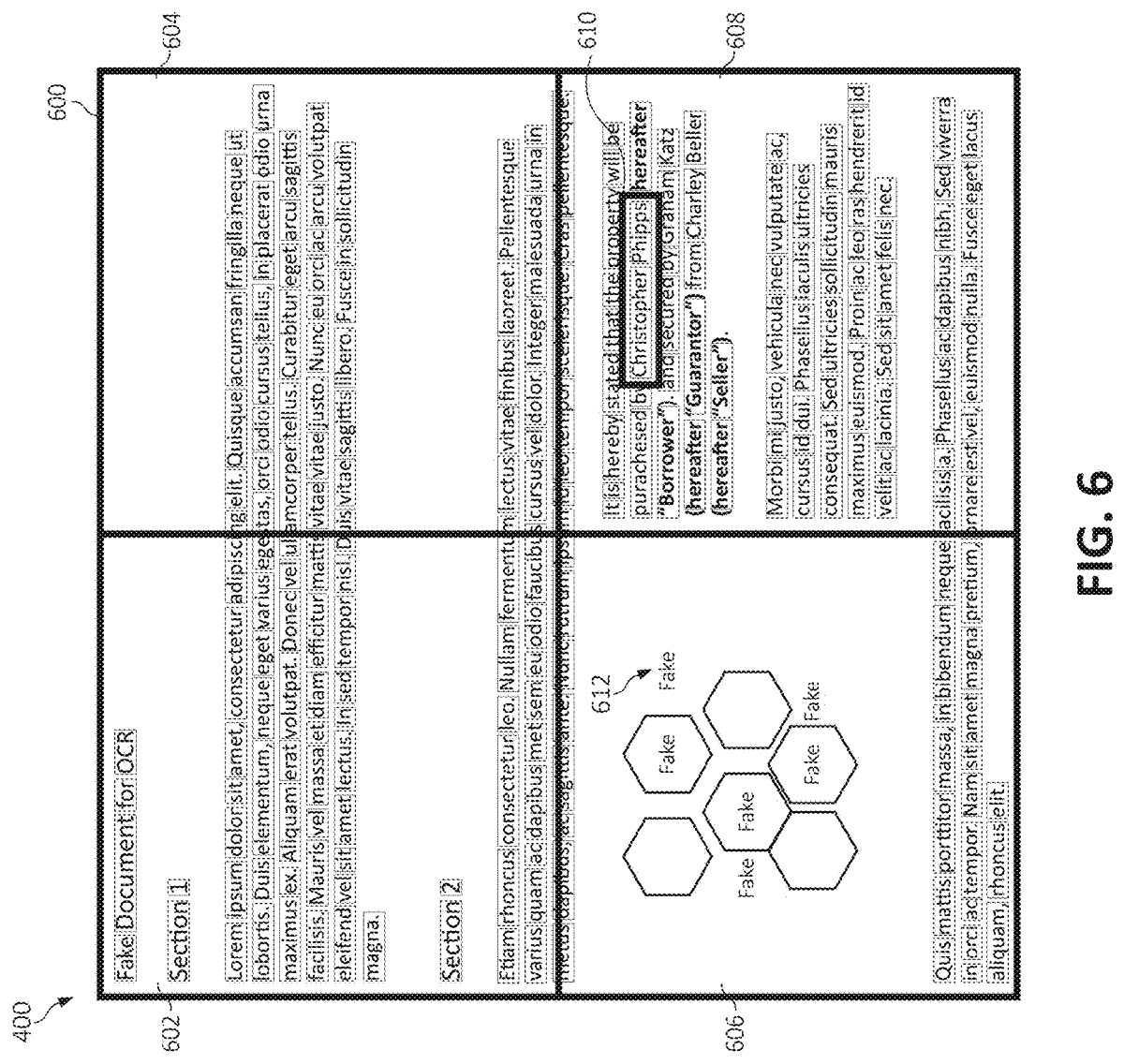

It should be noted that the grids 600 and 700, along with boxes 610 and 710, shown in FIGS. 6 and 7 may be provided simply to illustrate potential issues with OCR processing, particularly when performed on poor quality documents. However, the grids 600 and 700, along with the boxes 610 and 710, may be utilized by some embodiments described herein, such as to respectively indicate a selected portion (or term) of, or a target element within, an original document and a suspected (or potential) match in the OCR document, as described in greater detail below. As such, FIGS. 6 and 7 may illustrate the original document 400 and the OCR document 500 as displayed on a display device of a computing system utilizing the methods and/or systems described herein.

For example, referring again to FIG. 4, in some embodiments, a user first selects or identifies a target (or targeted) element (e.g., a word, phrase, alphanumeric characters, etc.) in the original document 400. As one example, the user may select "Christopher Phipps" as the target element(s). However, other elements may be targeted in other embodiments. For example, if the original document includes one or more loan documents, the names of the borrowers may be targeted (i.e., as opposed to guarantor and loan officer names) and/or the initial interest rates associated with the loan may be targeted (i.e., as opposed to revised interest rates, interest rates associated with other loans, tax rates, etc.).

In some embodiments, an annotator for the target element is created. For example, the annotator may be created via a rule (e.g., using a regular expression tester, a content analytics tool, etc.), a machine learning model, or other methods (e.g., "find every instance of "Christopher Phipps" in the OCR-converted version of this document). Such a step may not be utilized in some embodiments. However, utilizing such may increase the practical utility of the methods/systems described herein, as will be appreciated by one skilled in the art.

Still referring to FIG. 4, in some embodiments, the original document 400 is converted into an appropriate image (or image format) (if such has not already occurred). For example, if the original document 400 is a PDF file, the original document 400 may be converted into an image format (or file), such as RGB, CMYK, etc. In some embodiments, the original document 400 is then processed using any suitable OCR technique to generate an OCR-converted version of the original document (or an OCR document), such as the OCR document 500 shown in FIG. 5. However, the OCR processing may be performed at a later time (e.g., any time before searching the OCR document for the target element, as described below).

Referring again to FIG. 6, an indication of a selected portion of (and/or elements in) the original document 400 is received. For example, the user may utilize any suitable user input device (e.g., a mouse, keyboard, etc.) to select a portion of the original document 400. In the example shown, the user has created the box 610 around the term "Christopher Phipps." It should be noted that in some embodiments, the grid 600 is not shown and/or utilized. However, it may be included or created as, for example, a visual guide with respect to the position of the elements within the box (or selected portion) 610 relative to other elements in the original document 400.

Figure 8:
FIGS. 8 and 9 are plan views of a portion of the document of FIG. 6.

Referring now to FIG. 8, a detailed view of a section (or portion) 800 of the original document 400 is shown. In particular, the section 800 shown includes the selected portion (or box) 610 of the original document 400 (and/or the targeted element "Christopher Phipps"), along with some of the elements (e.g., words, alphanumeric characters, etc.) of the original document 400 that surround the selected portion 610 (e.g., "stated," "property," "secured," etc.).

Figure 9:
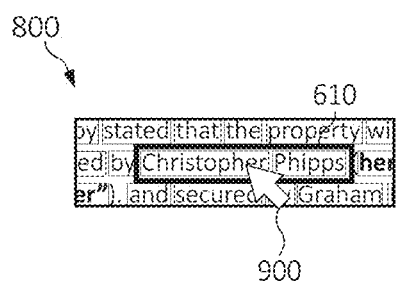

In some embodiments, salient pixels of the selected portion 610 are then identified, defined, and/or determined. For example, the user may manually select or indicate the salient pixels using any suitable user input device (e.g., a mouse, keyboard, etc.). An example of such is illustrated in FIG. 9, which shows the section 800 or the original document 400, along with the selected portion 610 and a cursor 900. That is, the cursor 900 may be utilized, along with a mouse, for example, to "click" on, trace, etc. the sub-regions or pixels within the selected portion 610 to indicate those areas as being salient (or select the other portions of the selected portion as being non-salient). In some embodiments, a machine learning method (or model) trained in salience detection may be implemented to determine the salient pixels.

The salient pixels are recorded, and properties associated with the salient pixels are determined or identified. For example, the relationship(s) between the salient pixels and other salient pixels and/or other pixels on other portions (e.g., inside and/or outside of the selected portion 610) of the original document 400 are determined (i.e., as the properties of the salient pixels). The relationships between pixels may be defined utilizing a geometric distance metric (e.g., two-dimensional Euclidean, Manhattan, or Minkowski distance metric) or other similar methods. The relationships may be utilized to create a "map" of the salient pixels and/or a representation (or "image") of the selected portion 610 of the original document. In some embodiments, the OCR-converted version of the original document (e.g., OCR document 500) is then processed as follows.

Figure 10:
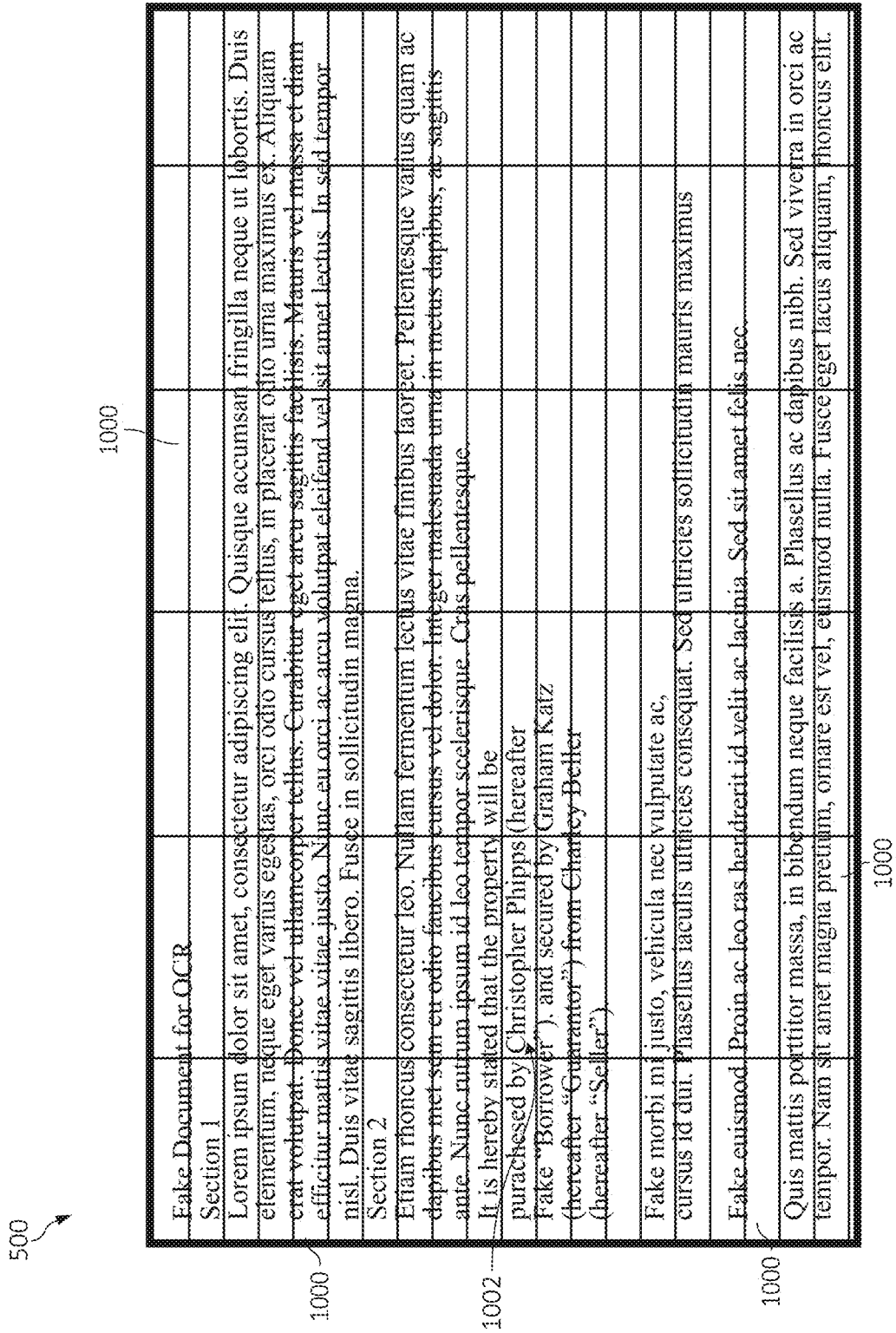
FIG. 10 is a plan view of the of the OCR-converted version of the document of FIG. 5 divided into multiple sections.

As shown in FIG. 10, in some embodiments, the OCR document 500 (and/or each page, section, etc. thereof) is then divided into sections 1000 (which may or may not be made visible to the user). Each of the sections 1000 may be of the same size and shape of the selected portion 610 of the original document 400 (e.g., at least relative to the respective sizes of the documents). In the example shown, the sections 1000 are rectangular (similar to the selected portion 610 of the original document 400) and arranged in a grid-like pattern. However, in some embodiments, the sections 1000 may be randomly positioned and may even overlap (e.g., to ensure each possible portion of the OCR document 500 is checked/searched).

The system then compares the pixel arrangements (or "images") (and/or properties thereof) in each of the sections 1000 to the representation (or image) of the selected portion 610 (i.e., the targeted element) of the original document 400 (and/or the determined properties of the salient pixels within). A geometric distance metric (e.g., two-dimensional Euclidean distance) or other similar methods may be utilized. As described above, a cognitive analysis or machine learning technique (or an appropriately trained model) may be utilized for this process.

In some embodiments, a similarity metric is used to determine which of the sections 1000 are "suspected matches" (or matches) to the selected portion 610 of the original document 400. For example, Jaccard coefficients, Pearson coefficients, or cosine similarity, as are commonly understood in the art, may be utilized. Additionally, the user may provide input associated with how closely the suspected matches should "match" or "look like" the selected portion 610 of the original document 400 (e.g., as a system setting, in preferences, etc.). In some embodiments, the result is that only those of the sections 1000 of the OCR document 500 that match or look like the selected portion 610 of the original document 400 within a predetermined degree are selected (or marked, stored, etc.) by the system as suspected matches. Still referring to FIG. 10, in the depicted embodiment, section 1002 (i.e., a particular one of the sections 1000) has been determined to be a suspected match to the selected portion 610 of the original document. However, it should be understood that in some embodiments, multiple sections may be selected as suspected matches (e.g., multiple instances of the same elements and/or different elements).

Figure 11:
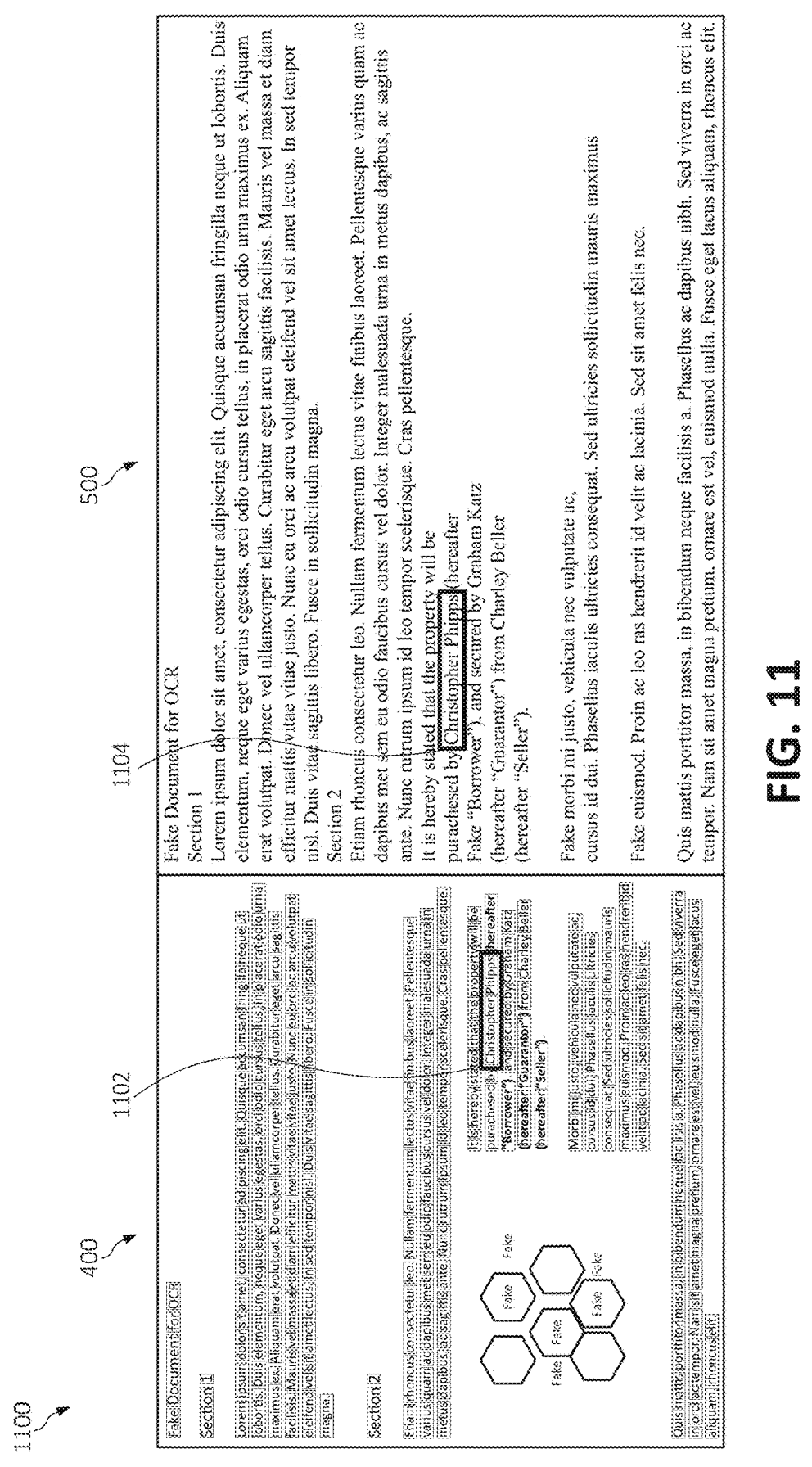

FIG. 11 illustrates an example of results (or a user interface displaying results) 1100 that may be returned by the methods and/or systems described herein. In the example shown, the results 1100 include a combined image of the original document 400 and the OCR document 500, along with boxes 1102 and 1104. Similar to box 610 described above, box 1102 indicates the selected portion (and/or the target element(s) "Christopher Phipps") of the original document 400, while box 1104 indicates a suspected match (i.e., "Christopher Phipps"). It should be noted that the results 1100 shown in FIG. 11 is merely provided as an exemplary manner in which the results (i.e., the suspected matches) may be provided (or displayed) to the user. As another example, separate images of the original document 400 and the OCR document 500 may be provided, as shown in FIGS. 6 and 7 (e.g., with or without the grids 600 and 700), with box 610 indicating the selected portion of the original document 400, and box 710 indicating a suspected match to the selected portion of the original document 400 (and/or the elements therein).

It should also be noted that the selected portion(s) of the original document and/or the suspected match(es) in the OCR document may be indicated in various ways (e.g., highlighting, only showing those portions as opposed to the entire page(s) of the documents, etc.). Further, in embodiments in which multiple suspected matches are identified (and/or suspected matches are identified in multiple OCR documents), the user may be provided with a manner to "scroll" or "flip" through the suspected matches (e.g., the suspected matches and/or the selected portion(s) of the original document are provided in a list). The user may then provide input (or feedback) with respect to the selected portions which may be utilized by the system to generate a list of the instances of the desired word, phrase, etc. in the OCR document(s) (and/or the appropriate portions thereof) and/or refine the returned results.

Figure 12:
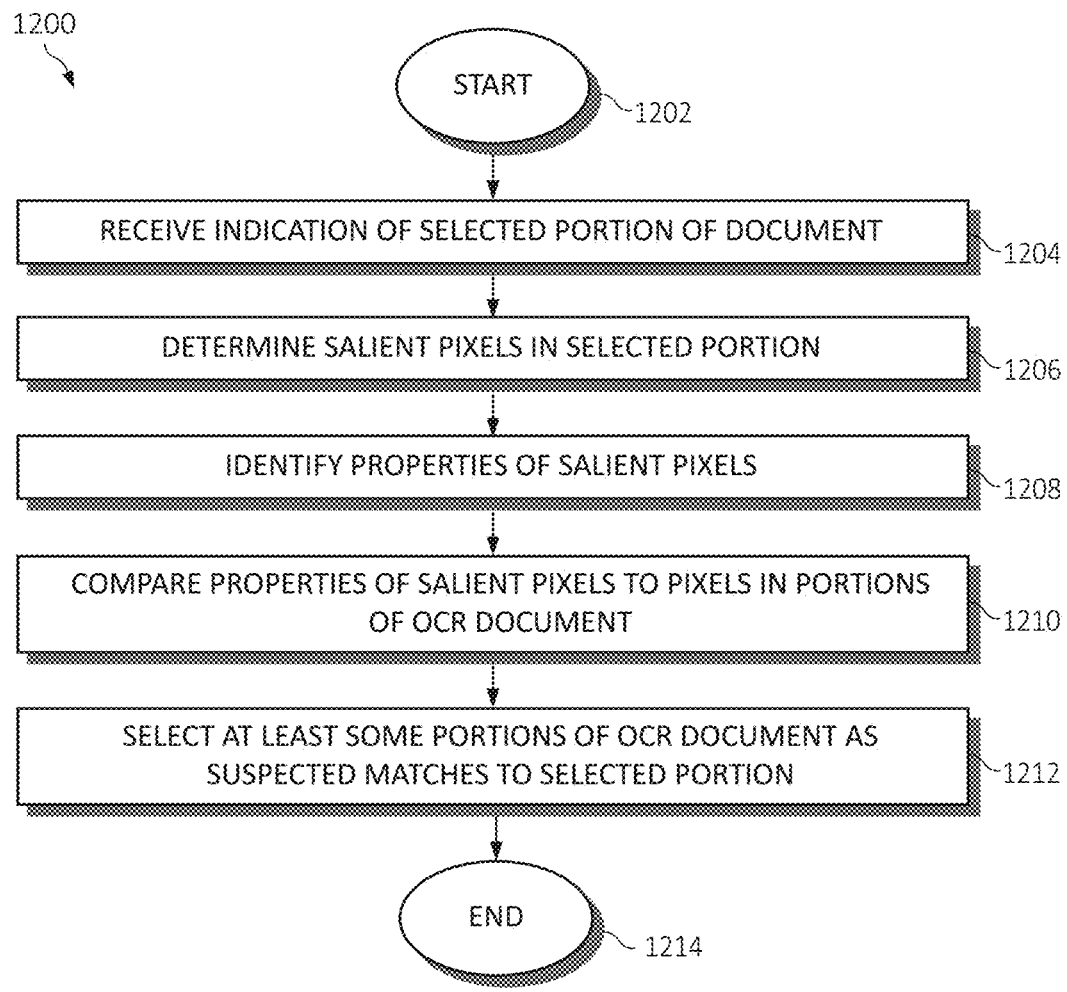
FIG. 12 is a flowchart diagram of an exemplary method for finding elements in OCR documents according to an embodiment of the present invention.

Turning to FIG. 12, a flowchart diagram of an exemplary method 1200 for finding elements in OCR documents is provided. The method 1200 begins (step 1202) with, for example, a user selecting one or more elements (e.g., words, phrases, alphanumeric characters, symbols, etc.) in an original (or non-OCR document), as described above.

An indication of a selected portion of document is received (step 1204). That is, the user may provide an indication of the portion(s) of the (original) document that include the selected element(s) (i.e., the target element(s)). The user may provide such an indication via any suitable means, such as a user input device (e.g., a mouse, keyboard, etc.).

Salient pixels in the selected portion of the document are determined (step 1206). The determining of the salient pixels in the selected portion of the document may include receiving an indication of the salient pixels from a user and/or be performed utilizing a machine learning method.

Properties of the salient pixels in the selected portion of the document are identified (step 1208). The identifying of the properties of the salient pixels in the selected portion of the document may include determining a relationship between the salient pixels in the selected portion of the document to other pixels in the document. The determining of the relationship between the salient pixels in the selected portion of the document to the other pixels in the document may be performed utilizing a geometric distance metric.

The properties of the salient pixels in the selected portion of the document are compared to properties of pixels in each of a plurality of portions of an OCR-converted version of the document (or an OCR document) (step 1210). Each of the plurality of portions of the OCR-converted version of the document may be the same size as the selected portion of the document.

At least some of the plurality of portions of the OCR-converted version of the document are selected as suspected matches to the selected portion of the document (step 1212). The selecting of the portions of the OCR-converted version of the document as suspected matches may be performed utilizing a cognitive analysis and/or a similarity metric.

Method 1200 ends (step 1214) with, for example, the results of the search being provided to the user. For example, an indication of the suspected matches to the selected portion of the document may be generated, as described above. The user may then provide input (or feedback) with respect to the selected portions, which may be utilized by the system to generate a list of the instances of the desired word, phrase, etc. in the OCR document(s) (and/or the appropriate portions thereof) and/or refine the returned results. In some embodiments, the feedback from users may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for finding elements in optical character recognition (OCR) documents comprising:
   receiving an indication of a selected portion of document;
   determining salient pixels in the selected portion of the document;
   identifying properties of the salient pixels in the selected portion of the document;
   comparing the properties of the salient pixels in the selected portion of the document to properties of pixels in each of a plurality of portions of an OCR-converted version of the document; and
   utilizing a cognitive analysis to select at least some of the plurality of portions of the OCR-converted version of the document as suspected matches to the selected portion of the document.

2. The method of claim 1, wherein said selection of the at least some of the plurality of portions of the OCR-converted version of the document as suspected matches to the selected portion of the document is performed utilizing a similarity metric.

3. The method of claim 1, wherein the identifying of the properties of the salient pixels in the selected portion of the document includes determining a relationship between the salient pixels in the selected portion of the document to other pixels in the document.

4. The method of claim 3, wherein the determining of the relationship between the salient pixels in the selected portion of the document to the other pixels in the document is performed utilizing a geometric distance metric.

5. The method of claim 1, wherein the determining of the salient pixels in the selected portion of the document includes receiving an indication of the salient pixels from a user, is performed utilizing a machine learning method, or a combination thereof.

6. The method of claim 1, wherein each of the plurality of portions of the OCR-converted version of the document is the same size as the selected portion of the document.

7. The method of claim 1, further comprising generating an indication of the suspected matches to the selected portion of the document.

8. A system for finding elements in optical character recognition (OCR) documents comprising:
   a processor executing instructions stored in a memory device, wherein the processor:
      receives an indication of a selected portion of document;
      determines salient pixels in the selected portion of the document;
      identifies properties of the salient pixels in the selected portion of the document;
      compares the properties of the salient pixels in the selected portion of the document to properties of pixels in each of a plurality of portions of an OCR-converted version of the document; and
      utilizes a cognitive analysis to select at least some of the plurality of portions of the OCR-converted version of the document as suspected matches to the selected portion of the document.

9. The system of claim 8, wherein said selection of the at least some of the plurality of portions of the OCR-converted version of the document as suspected matches to the selected portion of the document is performed utilizing a similarity metric.

10. The system of claim 8, wherein the identifying of the properties of the salient pixels in the selected portion of the document includes determining a relationship between the salient pixels in the selected portion of the document to other pixels in the document.

11. The system of claim 10, wherein the determining of the relationship between the salient pixels in the selected portion of the document to the other pixels in the document is performed utilizing a geometric distance metric.

12. The system of claim 8, wherein the determining of the salient pixels in the selected portion of the document includes receiving an indication of the salient pixels from a user, is performed utilizing a machine learning method, or a combination thereof.

13. The system of claim 8, wherein each of the plurality of portions of the OCR-converted version of the document is the same size as the selected portion of the document.

14. The system of claim 8, wherein the processor further generates an indication of the suspected matches to the selected portion of the document.

15. A computer program product for finding elements in optical character recognition (OCR) documents, by a processor, the computer program product embodied on a non-transitory computer-readable storage medium having computer-readable program code portions stored therein, the computer-readable program code portions comprising:

an executable portion that receives an indication of a selected portion of document;

an executable portion that determines salient pixels in the selected portion of the document;

an executable portion that identifies properties of the salient pixels in the selected portion of the document;

an executable portion that compares the properties of the salient pixels in the selected portion of the document to properties of pixels in each of a plurality of portions of an OCR-converted version of the document; and an executable portion that utilizes a cognitive analysis to select at least some of the plurality of portions of the OCR-converted version of the document as suspected matches to the selected portion of the document.

16. The computer program product of claim 15, wherein said selection of the at least some of the plurality of portions of the OCR-converted version of the document as suspected matches to the selected portion of the document is performed utilizing a similarity metric.

17. The computer program product of claim 15, wherein the identifying of the properties of the salient pixels in the selected portion of the document includes determining a relationship between the salient pixels in the selected portion of the document to other pixels in the document.

18. The computer program product of claim 17, wherein the determining of the relationship between the salient pixels in the selected portion of the document to the other pixels in the document is performed utilizing a geometric distance metric.

19. The computer program product of claim 15, wherein the determining of the salient pixels in the selected portion of the document includes receiving an indication of the salient pixels from a user, is performed utilizing a machine learning method, or a combination thereof.

20. The computer program product of claim 15, wherein each of the plurality of portions of the OCR-converted version of the document is the same size as the selected portion of the document.

21. The computer program product of claim 15, wherein the computer-readable program code portions further include an executable portion that generates an indication of the suspected matches to the selected portion of the document.

* * * * *